Patented May 29, 1923.

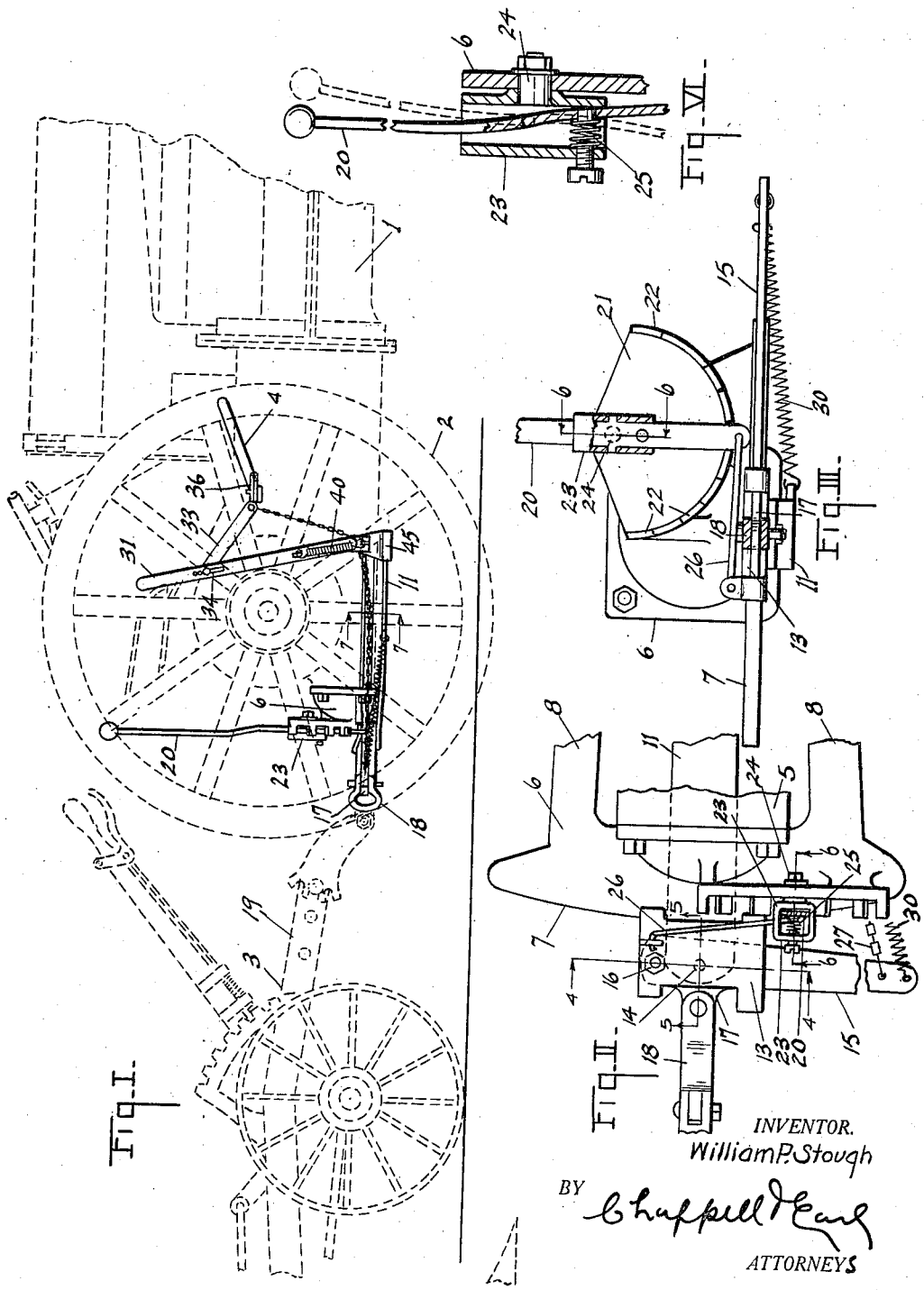

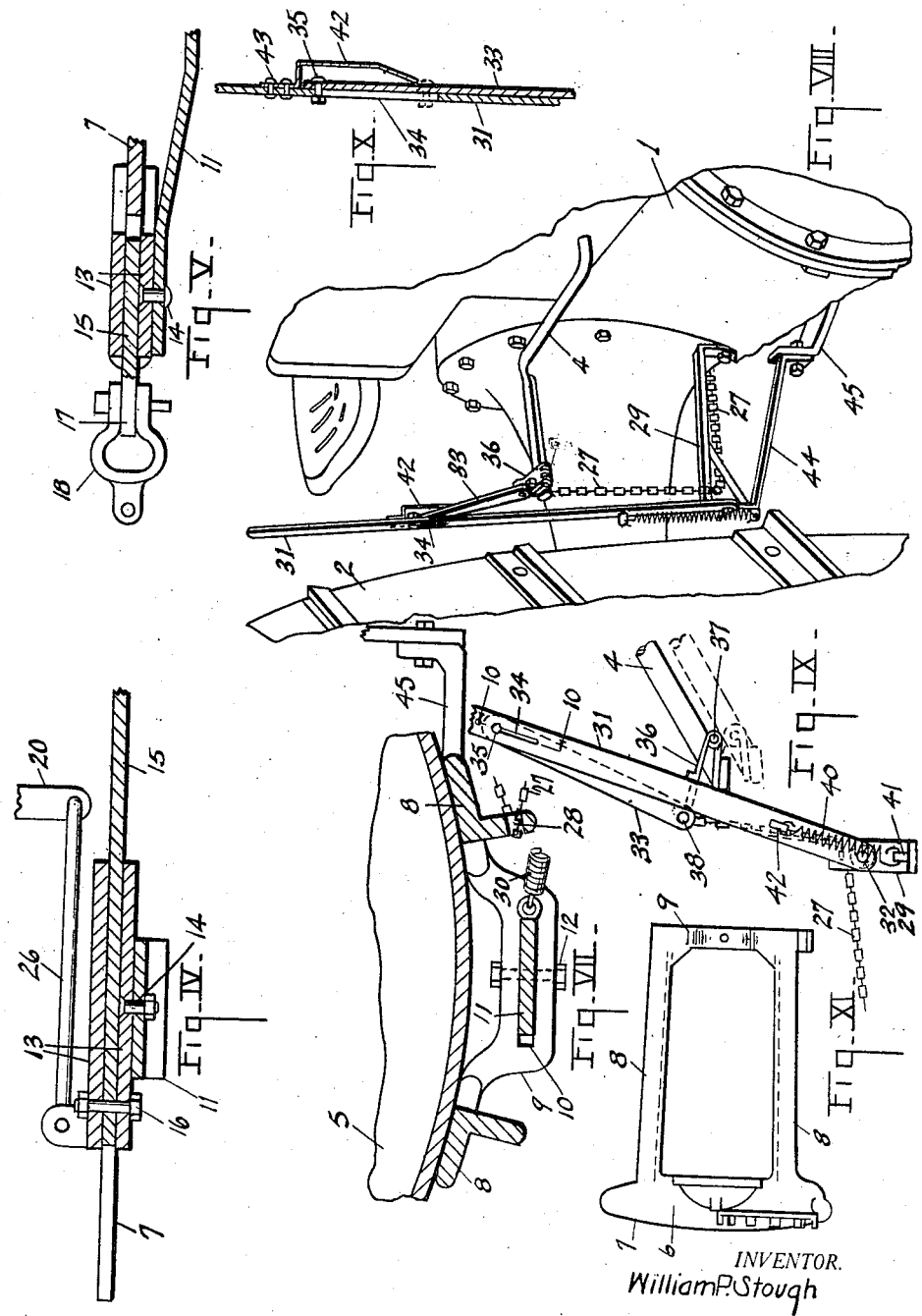

1,457,046

UNITED STATES PATENT OFFICE.

WILLIAM P. STOUGH, OF SHERWOOD, MICHIGAN.

HITCH AND CLUTCH RELEASE DEVICE FOR TRACTORS.

Application filed June 17, 1922. Serial No. 568,927.

*To all whom it may concern:*

Be it known that I, WILLIAM P. STOUGH, a citizen of the United States, residing at Sherwood, county of Branch, State of Michigan, have invented certain new and useful Improvements in Hitch and Clutch Release Devices for Tractors, of which the following is a specification.

This invention relates to improvements in hitch and clutch release devices for tractors.

The main objects of the invention are:

First, to provide in a tractor an improved automatic clutch release adapted to be automatically actuated when the drawn implement engages an obstruction such as likely to break parts were the pull continued.

Second, to provide in a tractor an improved hitch device by means of which the draft of the drawn implement may be adjusted laterally.

Third, to provide a structure having these advantages which is very easily operated to secure the various adjustments.

Fourth, to provide a structure having these advantages in which the parts are so formed and arranged that the strain thereon is minimized, and therefore may be made of relatively light weight and at the same time possess the requisite strength.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a side view of a structure embodying the features of my invention, portions of the tractor and drawn implement, a plow in this instance, being shown by dotted lines.

Fig. II is a fragmentary plan view of my improved hitch and clutch release mechanism.

Fig. III is a rear elevation of the parts shown in Fig. II with certain parts sectioned the better to show structural details.

Fig. IV is a detail vertical transverse section on a line corresponding to line 4—4 of Fig. II.

Fig. V is a detail vertical longitudinal section on a line corresponding to line 5—5 of Fig. II.

Fig. VI is a detail section on a line corresponding to line 6—6 of Figs. II and III showing details of the hitch shifting or adjusting mechanism.

Fig. VII is a detail vertical transverse section on a line corresponding to line 7—7 of Fig. I showing the connections for the draw bar.

Fig. VIII is fragmentary perspective view showing the connections to the tractor clutch lever.

Fig. IX is a detail side elevation of the clutch shifting lever and the connections for the clutch lever thereto.

Fig. X is a detail section on a line corresponding to line 10—10 of Fig. IX.

In the drawing the sectional views are taken looking in the direction of the little arrows at the ends of the section lines and similar numerals of reference refer to similar parts throughout the several views.

Referring to the drawing, 1 represents the tractor and 2 the traction wheels thereof. 3 is the drawn implement such as a plow. The tractor illustrated is a Fordson tractor and is provided with the usual clutch control lever 4 which is designed by the manufacturer to be operated by the foot of the operator. In Fig. I this lever is shown in the position occupied when driving the belt pulley. In Fig. IX the lever is shown by full lines in the position it occupies when power is applied to the traction wheels and by dotted lines in its clutch disengaging position.

As the tractors are put out by the manufacturer a draft bracket is mounted on the tractor body at 5. This I remove and substitute therefor a draft device supporting frame 6 having a segmental way 7 at its rear end and forwardly projecing arms 8 connected by a cross piece 9. This cross piece is offset downwardly as shown in Fig. VII and slotted at 10 to receive the draw bar 11 which is secured thereto by the draw bolt 12. On the rear end of this draw bar is a carriage 13 adapted to slide on the way 7, this carriage being, in the structure illustrated, formed of a bar of steel folded upon itself as shown in Fig. V. The carriage is secured to the draw bar by the bolt 14 which allows for the swinging of the draw bar.

A draft lever 15 is pivoted at 16 to one side of the carriage and is provided with a rearwardly projecting lug 17 to which the coupling or clevis 18 is engaged for securing the plow beam 19 thereto. This carriage 13 is adjusted and retained in its adjusted position by means of the lever 20 coacting with the segment 21 having teeth 22 at the bottom thereof. The lever is supported by the pivoted holder 23 through which the lever is arranged as shown in Fig. VI, the lever being bent or cammed so that when pushed forward as shown by dotted lines in Fig. VI its lower end is swung out of engagement with the teeth 22 and the lever may be swung on the pivot 24 of the holder 23. The lever is held in engaging position by the coiled spring 25 arranged within the holder, see Fig. VI. The lower end of the lever is connected by the link 26 to the carriage.

With this arrangement the pull or strain on the lever is received directly by the teeth of the segment and not through pivots or other supporting means for the lever.

The draft lever 15 is connected by the chain 27 to the clutch lever 4, the chain being passed through a hole 28 in the supporting frame 8 and through the bracket 29 to properly guide and direct the pull of the chain. When the lever 15 is moved rearwardly the pull on the chain actuates the clutch lever to the position shown by dotted lines in Fig. IX, thereby releasing the clutch. A spring 30 of sufficient strength to normally sustain the pull of the drawn implement is connected to the outer end of the lever and to the draw bar 11.

To permit the actuation of the clutch by hand I provide a hand lever 31 which is pivoted at 32 on the bracket 29 and is connected to the clutch lever 4 by the link 33. The connection for the link 33 to the lever 31 is a pin and slot connection, the lever being longitudinally slotted at 34 to receive the pin 35. The connection for the lower end of the link to the clutch lever 4 is by means of the hinged arm 36 pivoted to the footpiece of the clutch lever at 37 and to the link at 38. The lever 31 is provided with a spring 40 which is connected to the bracket 29 at 41 and to an ear 42 on the lever, the connection 41 being below the pivot so that as the lever is swung the spring swings past the pivot 32, thereby holding the hand lever in either its rear position as shown in Fig. I, in which position the clutch lever 4 is in pulley driving position, or in its forward position as shown in Fig. IX, in which position the clutch is engaged to drive the traction wheels.

In the event of the plow or drawn implement coming in contact with an obstruction, the spring 30 yields permitting the pull on the chain 27 and, through the connections to the clutch lever 4 described, releases the clutch. The link connection for the clutch lever to the hand lever, or hand clutch releasing lever 31, permits this movement without any movement of or stress upon the hand lever.

Further, I provide a spring catch 42 which is mounted upon the hand lever at 43 and adapted to engage the head of the pin 35 which serves as a coacting stop, thus the clutch lever is held in disengaged position until this catch is released and the clutch reengaged after the implement has been suitably manipulated to free the obstruction or as may be desired in freeing the implement from the obstruction. The bracket 29 is provided with a brace 44 extending from the bracket 45 provided therefor on the supporting frame 8.

I have illustrated and described my improvements in an embodiment or adaptation which I have found very practical. I have not attempted to illustrate or describe other modifications and adaptations which might be desirable in adapting my improvements to other makes of tractors as I believe the disclosure made will enable those skilled in the art to which my invention relates to embody or adapt the same as may be desired.

Having thus described my invention what I claim as new and desire to secure by Letters Patent is:

1. In a device of the class described, the combination with a tractor provided with a clutch control lever, of a draft frame mounted on said tractor and provided with a rearwardly facing curved way at its rear end and with forwardly projecting arms connected by a downwardly offset cross piece, a draw bar pivotally mounted on said cross piece, a slide carriage mounted on said way and pivotally connected to said draw bar, a draft lever pivoted on said carriage and adapted to be connected to an implement to be drawn, a draft spring connected to said draft lever, operating connections for said draft lever to said clutch control means, an adjusting means for said carriage comprising a segment having a series of teeth at its lower edge, an adjusting lever pivotally and laterally adjustable on said segment to directly engage said teeth, and a link connecting said carriage to said lever adjacent its point of engagement with said segment teeth.

2. In a device of the class described, the combination with a tractor, of a draft frame mounted on said tractor and provided with a rearwardly facing curved way at its rear end and with forwardly projecting arms connected by a downwardly offset cross piece, a draw bar pivotally mounted on said cross piece, a slide carriage mounted on said way and pivotally connected to said draw bar, an adjusting means for said carriage comprising a segment having a series of teeth at its lower edge, an adjusting lever pivotally and laterally adjustable on said segment to directly engage said teeth, and a link connecting said carriage to said lever adjacent its point of engagement with said segment teeth.

3. In a device of the class described, the combination with a tractor provided with a clutch control lever, of a draft frame mounted on said tractor and provided with a rearwardly facing curved way at its rear end and with forwardly projecting arms connected by a downwardly offset cross piece, a draw bar pivotally mounted on said cross piece, a slide carriage mounted on said way and pivotally connected to said draw bar, a draft lever pivoted on said carriage and adapted to be connected to an implement to be drawn, a draft spring connected to said draft lever, operating connections for said draft lever to said clutch control means, and an adjusting means for said carriage.

4. In a device of the class described, the combination with a tractor provided with a clutch control lever, of a draft frame mounted on said tractor, a swinging draw bar, a carriage mounted on said draft frame and connected to said draw bar, a draft lever pivoted on said carriage and adapted to be connected to an implement to be drawn, a draft spring connected to said draft lever, operating connections for said draft lever to said clutch control means, an adjusting means for said carriage comprising a segment having a series of teeth at its lower edge, an adjusting lever pivotally and laterally adjustable on said segment to directly engage said teeth, and a link connecting said carriage to said lever adjacent its point of engagement with said teeth.

5. In a device of the class described, the combination with a tractor, of a draft frame mounted on said tractor, a swinging draw bar, a carriage mounted on said draft frame and connected to said draw bar, an adjusting means for said carriage comprising a segment having a series of teeth at its lower edge, an adjusting lever pivotally and laterally adjustable on said segment to directly engage said teeth, and a link connecting said carriage to said lever adjacent its point of engagement with said teeth.

6. In a device of the class described, the combination with a tractor of a draft frame mounted on said tractor, a pivoted draw bar, a carriage mounted on said frame and connected to said draw bar, an adjusting means for said carriage comprising an adjusting lever, a segment provided with teeth with which said adjusting lever may be directly engaged for supporting the lever in its adjusted positions, and a link connecting said carriage to said lever adjacent its point of engagement with said teeth.

7. In a structure of the class described, the combination of a tractor provided with a clutch control lever, a movable draft member to which the implement to be drawn is connected, a draft spring for said draft member, a pivotally mounted hand lever, a pivoted arm on said clutch control lever, a link connecting said hand lever to said arm, said link having a lost motion connection to said lever, a spring acting to yieldingly hold said hand lever in its adjusted positions, a clutch releasing chain connecting said draft member to said arm on said clutch control lever, and a catch on said hand lever coacting with said link for holding said clutch control lever in its clutch disengaging position.

8. In a structure of the class described, the combination of a tractor provided with a clutch control lever, a movable draft member to which the implement to be drawn is connected, a draft spring for said draft member, a pivotally mounted hand lever, a pivoted arm on said clutch control lever, a link connecting said hand lever to said arm, said link having a lost motion connection to said lever, a spring acting to yieldingly hold said hand lever in its adjusted positions, and a clutch releasing chain connecting said draft member to said arm on said clutch control lever.

9. In a structure of the class described, the combination of a tractor provided with a clutch control lever, a movable draft member to which the implement to be drawn is connected, a draft spring for said draft member, a pivotally mounted hand lever, a pivoted arm on said clutch control lever, a link connecting said hand lever to said arm, said link having a lost motion connection to said lever, a clutch releasing chain connecting said draft member to said arm on said clutch control lever, and a catch on said hand lever coacting with said link for holding said clutch control lever in its clutch disengaging position.

10. In a structure of the class described, the combination of a tractor provided with a clutch control lever, a movable draft member to which the implement to be drawn is connected, a draft spring for said draft member, a pivotally mounted hand lever, a pivoted arm on said clutch control lever, a link connecting said hand lever to said arm, said link having a lost motion connection to said lever, and a clutch releasing chain connecting said draft member to said arm on said clutch control lever.

11. In a structure of the class described, the combination of a tractor provided with a clutch control lever, a movable draft member to which the implement to be drawn is connected, a draft spring for said draft member, a hand lever operatively associated with said control lever, a clutch releasing connection for said draft member to said control lever, and a catch on said hand lever for holding said control lever in its clutch releasing position when actuated by said draft member.

In witness whereof I have hereunto set my hand and seal.

WILLIAM P. STOUGH. [L. S.]